United States Patent
Zangl et al.

(10) Patent No.: US 7,368,922 B2
(45) Date of Patent: May 6, 2008

(54) METHOD AND DEVICE FOR DETERMINING PARAMETERS OF FLUCTUATING FLOW

(75) Inventors: Hubert Zangl, Mitterdorf (AT); Anton Fuchs, Graz (AT)

(73) Assignees: Technische Universitat Graz, Graz (AT); Forschungsholding Tu Graz GmbH, Graz (AU)

( * ) Notice: Subject to any disclaimer, the term of this patent is extended or adjusted under 35 U.S.C. 154(b) by 0 days.

(21) Appl. No.: 10/588,814

(22) PCT Filed: Feb. 10, 2005

(86) PCT No.: PCT/AT2005/000044

§ 371 (c)(1),
(2), (4) Date: Mar. 27, 2007

(87) PCT Pub. No.: WO2005/075945

PCT Pub. Date: Aug. 18, 2005

(65) Prior Publication Data

US 2007/0186679 A1     Aug. 16, 2007

(30) Foreign Application Priority Data

Feb. 10, 2004   (AT)  ................................ A 189/2004

(51) Int. Cl.
*G01R 27/26*   (2006.01)
(52) U.S. Cl. ...................... 324/671; 324/453; 324/672; 324/676
(58) Field of Classification Search ................ 324/605, 324/672, 453, 671; 73/861.08, 861.12, 861.15
See application file for complete search history.

(56) References Cited

U.S. PATENT DOCUMENTS 4,568,874 A     2/1986   Kramer et al.

(Continued)

FOREIGN PATENT DOCUMENTS

DE          39 09 177 A1        1/1990

(Continued)

OTHER PUBLICATIONS

Ning-De Jin, Jun Wang, Li-Jun Xu; Optimization of a Conductive Probe With Vertical Multi-Electrode Array for the Measurement of Oil-Water Two-Phase Flow; Proceedings of the Second Intl. Conference on Machine Learning and Cybernetics, Xi'an, Nov. 2-5, 2003; IEEE 2003 pp. 899-905.

(Continued)

*Primary Examiner*—Vincent Q. Nguyen
(74) *Attorney, Agent, or Firm*—RatnerPrestia (57) ABSTRACT

The invention relates to a method and a device for determining the parameters of a fluctuating flow of a fluid in a pipe, wherein at least three electrodes that are placed at a distance from one another in the direction of flow are provided in the periphery of the flow, wherein alternating voltage signals are fed to a first upstream transmission electrode arrangement and to a second downstream transmission electrode arrangement and the receiving signals generated by the displacement current are detected in a receiving electrode arrangement located between the transmission electrodes and subjected to a time-discrete cross-correlation. The throughput times of the fluctuations detected by the electrodes are determined on the basis of the results.

18 Claims, 4 Drawing Sheets

U.S. PATENT DOCUMENTS

| | | |
|---|---|---|
| 4,604,904 A | 8/1986 | Massen |
| 4,752,727 A | 6/1988 | Schneider |
| 5,038,110 A * | 8/1991 | Braun et al. ................ 324/675 |
| 5,052,223 A | 10/1991 | Regnault et al. |
| 5,722,290 A | 3/1998 | Kronberg |
| 5,944,955 A * | 8/1999 | Bossen et al. .............. 162/198 |
| 6,345,537 B1 | 2/2002 | Salamitou |
| 2003/0020493 A1 | 1/2003 | Haase et al. |

FOREIGN PATENT DOCUMENTS

| | | |
|---|---|---|
| DE | 40 25 952 A1 | 7/1991 |
| DE | 69 001 151 T | 10/1993 |
| DE | 44 42 711 A1 | 6/1996 |
| DE | 195 16 809 C1 | 9/1996 |
| DE | 196 13 813 A1 | 10/1997 |
| DE | 197 21 255 A1 | 12/1997 |
| DE | 197 57 190 A1 | 6/1999 |
| DE | 197 54 093 A1 | 7/1999 |
| DE | 199 16 979 A1 | 11/2000 |
| DE | 199 38 270 A1 | 2/2001 |
| DE | 199 49 985 A1 | 5/2001 |
| DE | 100 08 093 A1 | 9/2001 |
| DE | 100 63 557 A1 | 7/2002 |
| DE | 695 30 863 T2 | 1/2004 |
| EP | 0 108 876 A1 | 5/1984 |
| EP | 0 326 266 A2 | 8/1989 |
| EP | 0 760 467 A1 | 3/1997 |
| GB | 2 194 058 A | 2/1988 |
| WO | WO 01/65212 A1 | 9/2001 |

OTHER PUBLICATIONS

PCT International Search Report for PCT International Application No. PCT/AT2005/000044 mailed Jul. 25, 2005.

* cited by examiner

METHOD AND DEVICE FOR DETERMINING PARAMETERS OF FLUCTUATING FLOW

This apnlication is a U.S. National Phase Application of PCT International Application No. PCT/AT2005/000044, filed Feb. 2, 2005.

1. FIELD ON THE INVENTION

The invention relates to a method for determining parameters of a fluctuating stream of a fluid in a pipe using at least three electrodes provided at the periphery of the stream and situated at a distance from one another in the direction of flow.

The invention likewise relates to a device for determining parameters of a fluctuating stream of a fluid in a pipe using at least three electrodes provided at the periphery of the stream and situated at a distance from one another in the direction of flow.

2. BACKGROUND

A large number of methods and corresponding devices are available for capacitive measuring of the filling level in containers. Capacitive sensors with contactless operation for the recognition of the filling level of a dielectric medium inside containers having nonmetallic walls are known and are used, for example, in the chemical and pharmaceutical industries. DE 19949985 C2, for example, describes a sensor of this type. A construction consisting of a number of sensor fields arranged like a matrix is disclosed in DE 10008093 A1. A large number of capacitive sensors utilize stepped probes for determining the filling level (cf. DE 69001151 T2, DE 19938270 A1, DE 19757190 A1, DE 19721255 A1, or DE 19613813 C2) or other non-contactless methods (cf. DE 19754093 C2, DE 19516809 C1, or DE 10063557 A1). Moreover, methods for measuring a filling level using a plurality of capacitive sensors arranged next to one another along a filling path are known from DE 19916979 A1. U.S. Pat. No. 5,722,290 A describes the construction of a capacitive filling level meter having a ring oscillator. DE 69530863 T2 describes a filling level sensor, based on a transit time measurement, which can also be used as a linear path transducer. In EP 0760467 A1 too, there is described a method of measuring the filling level in a tube utilizing a capacitive method.

Methods and devices for the determination of density profiles in closed delivery devices are also known in the prior art. These methods include the class of electrical capacity tomography sensors (ECT). An example is shown in EP 0326266, in which appropriate reconstruction methods are also disclosed.

In U.S. Pat. No. 4,568,874 A, an arrangement is disclosed in which the presence of a liquid is determined with the aid of at least three electrode rings, the sensitivity being decreased by conductive deposits in the tube. The arrangement is used not for velocity measurement, but exclusively for density measurement. Determination of the dielectric property of the stream of transported material at the observation sites. (Kein Satz)

In U.S. Pat. No. 4,568,874 A, the method of "active guarding" is used, in which the auxiliary electrodes are supplied with the potential of the receiving electrodes in order to avoid unwanted effects or to shift the sensitivity range. This is a complicated method as regards circuit technology.

A device for capacitive measurement involving a reduction of leakage field interference is described in DE 4442711 A1. Here again, controlled auxiliary (active guarding) electrodes are used, which is again accompanied by a corresponding outlay in terms of circuit technology.

Many methods and relevant devices have been disclosed for measuring the velocity of flow of a stream of transported material. For instance, DE 4025952 A1 describes the measurement of the velocity of flow of fine-grain bulk goods in a pneumatic or hydraulic suspension by means of a contactless measuring method implementing capacitive sensors. Here, two transmitting electrodes lie spatially opposite to a sensor electrode on the outside of a measuring tube, an AC voltage being applied out of phase to the transmitting electrodes. Downstream or upstream thereof, again two transmitting electrodes and a sensor electrode are provided, the voltage supply here being of a different frequency. Using phase-sensitive rectifiers and signal processing by means of cross correlation, random fluctuations are detected and from these conclusions are drawn as to the velocity of flow. A similar measuring configuration having two pairs of electrodes is known from DE 3909177 A1. Just as in the aforementioned document, the detection and evaluation of random fluctuations of the mass flow, in this case coal dust, take place after high signal amplification with the aid of phase-sensitive rectifiers and a transit time correlator.

A measuring arrangement described in WO 01/65212 A1 uses two annular capacity sensors, located at a distance from one another and surrounding a flow pipe externally, having at least three electrodes each. Flow parameters are obtained by detection of capacity changes of the two sensors and cross correlation.

The problem of the spatial averaging of fluctuations is also known in the prior art. In EP 0108876 A1, a device is described in which spatial averaging is carried out by distribution of the electrodes in a pseudo-random manner along the tube, in order, on the one hand, to obtain sufficiently strong signals and, on the other hand, to reduce the averaging effect.

In the case of known flow measurements, a dielectric property of the transported material is determined at at least two sites in the direction of flow. It is necessary for this dielectric property to exhibit temporal fluctuations at each observation site. These fluctuations of the dielectric property can be of natural origin (e.g. concentration variations in the case of a turbulent flow) or can be introduced intentionally (e.g. injection of another medium into the stream of transported material).

On account of the necessary spatial extent of the measuring devices (electrodes), averaging of the fluctuations is carried out, which in turn leads to attenuation of the signal resolution.

A further difficulty consists in the fact that due to the formation of leakage fields a wide sensitivity range is produced which extends beyond the desired observation range of the measuring system. In order to obtain an adequate signal resolution, the distance between the two observation sites must be large. On the other hand, a large distance, in particular in the case of turbulent flow conditions, means that fluctuations during the movement from an observation site upstream to an observation site downstream are greatly changed (rheological disintegration of the fluctuation), whereby the signal strength of the correlation result decreases.

In particular, the use of a plurality of electrodes, as is necessary in the determination of a profile, further leads to high circuit complexity, since it is necessary to determine a number of measured values.

The complex arrangement of electrodes, electronics, and screening leads to complex mechanical layouts, which are in general difficult to incorporate in existing units.

BRIEF DESCRIPTION

Thus, one aspect of the invention provides a method and a measuring system which reduces the wide-range sensitivity of a capacitive measuring system for the measurement of a dielectric property and thereby makes it possible to reduce the distance between two observation sites.

A further aspect of the invention provides reduced averaging of fluctuations by increasing local sensitivity. Both features lead to an improvement in the determination of the velocity/velocity profile and density/density profile of a stream of transported material.

Yet a further aspect of the invention comprises reducing the complexity of the electronic circuit and thus the costs of production, particularly when a plurality of electrodes is used.

To achieve at least one of these aspects in a device of the type mentioned at the outset, the invention provides for AC voltage signals to be fed to a first transmitting electrode configuration located upstream and to a second electrode configuration located downstream and the resulting signals received in a receiving electrode configuration located between the transmitting electrodes are detected by means of dielectric currents and are subjected to a time-discrete cross correlation, the transit times of the fluctuations detected by the electrodes being determined from the results.

The aspects of the invention are likewise achieved with the aid of a device of the type indicated at the outset, which, according to the invention, is characterized by a first transmitting electrode configuration (S1) located upstream and a second transmitting electrode configuration (S2) located downstream, and a receiving electrode configuration (E) located between the transmitting electrodes, these electrode configurations being provided at the periphery of a stream of a fluid passing through a pipe, and a receiving and evaluation device for detecting the received signals ($S_e$) produced by dielectric currents, for carrying out a time-discete cross correlation, and for determining the transit times of the fluctuations detected by the electrodes from the cross correlation values.

The present invention differs from many of the known devices in that the electrode means are not arranged orthogonally to the direction of flow, and in that a common receiving electrode can be used for both measuring sites. The advantages resulting therefrom are treated at length in the detailed description of the invention.

The present invention also offers the advantage that the measurement of the coupling capacities takes place in the direction of flow, whereby the local sensitivity is increased. Further, by this means the space required by the device can be reduced compared with known capacitive flow sensors.

The measurements can be carried out under dynamic conditions (in a stream of transported material) or under static conditions (stationary material), under which latter conditions it is only possible to determine the density or the density profile.

The nature and rheological properties of the loaded substance represent no restriction in this case, since the measurement is based on a contactless, capacitive method.

Further advantageous features are characterized in the dependent subclaims 2 to 10 and 12 to 17.

BRIEF DESCRIPTION OF DRAWINGS

The invention, along with further advantages, is illustrated in greater detail below with reference to exemplary embodiments, which are illustrated in the figures, in which.

Figure 1:
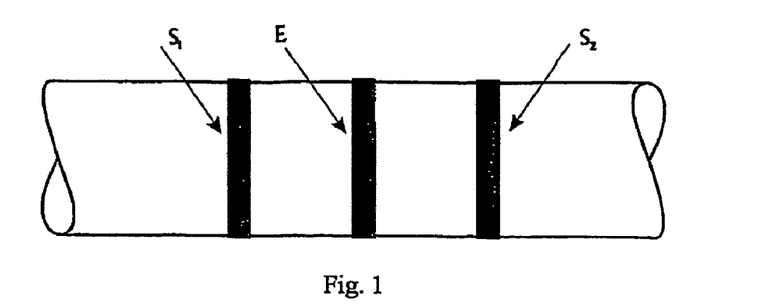
FIG. 1 is a diagrammatic side view of a section of tube having an electrode configuration according to the invention.

In the description which now follows, FIG. 1 shows a tube of insulating material, on which there are disposed, externally, an annular receiving electrode E and two annular transmitting electrodes S1 and S2.

Figure 2:
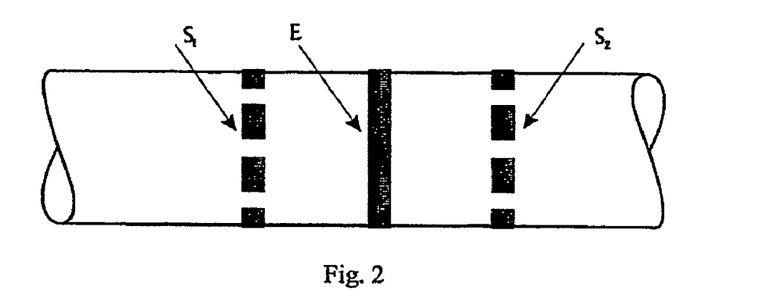
FIG. 2 is a view similar to FIG. 1, of another embodiment of an electrode configuration according to the invention.
Figure 3A:
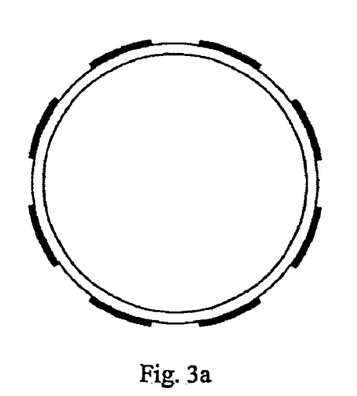
FIGS. 3a and 3b show the arrangement of electrodes on a tube in diagrammatic cross sections.
Figure 3B:
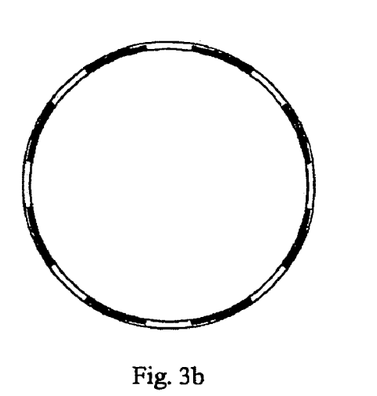

According to FIG. 2, each transmitting electrode is subdivided into eight individual electrodes, which according to FIG. 3a are located externally on a tube, but according to FIG. 3b are incorporated in a tube.

Figure 4:
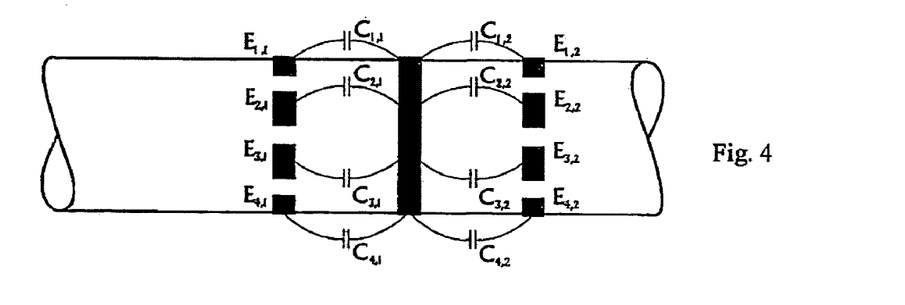
FIG. 4 is an illustration similar to FIG. 2, in which the coupling capacities between the electrodes are drawn.

As can be seen from FIG. 4, the transmitting device and receiving device can in principle be interchanged, since the coupling capacities remain the same. On account of the customarily higher complexity of the receiving device in the capacitive measuring technique, however, the use of a common receiving device is recommended. The further descriptions of the invention therefore relate to this preferred embodiment having a number of transmitting devices and a common receiving device.

By means of the configuration of the electrodes described in the invention and the appropriate evaluation, good decoupling of the transmitting devices is achieved, since the field lines emanating from one transmitting device terminate in the receiving device without first penetrating the field of action of the second transmitting device. The two transmitting devices can consequently be situated at a very short distance from one another in the direction of flow, but separated, at least, by the receiving device, without causing noticeable crosstalk. The short distance which can be achieved using the principle underlying the invention enables noninvasive measurement of the rate of transport even with streams in which fluctuations change greatly in a short time (or over a short delivery distance), for example due to thorough mixing (e.g. strongly turbulent streams). Moreover, the averaging effect, which occurs over long distances, is greatly reduced. As a result, such spatially small disturbances cause correspondingly greater signal amplitudes.

The embodiment is designed such that electrodes and evaluation electronics can be used for the capacitive measurement of all of the transport properties and transport parameters indicated.

The physical principle underlying the invention is the change in coupling capacities by dielectrics having relative dielectric constants differing from 1.

The simplest embodiment of the subject matter of the invention is depicted in FIG. 1, the velocity being determined by means of correlative methods. With the refined geometry according to FIG. 2, a density measurement and the measurement of the spreading behavior of the transported material in the direction of flow can be implemented in addition to the velocity measurement.

The measurement of the coupling capacities between the electrodes described is carried out, for example, sequentially by means of a channel, all of the electrodes of the transmitting devices being activated very rapidly in succession. One possibility of measurement and evaluation is now explained with reference to FIG. 13. This shows a block circuit diagram of the measurement circuit in the time division multiplexer variant. By means of a switching device 2, a high-frequency signal is led from a source 1, in the simplest case square wave signals, via a driver circuit AST, in the simplest case switching by AND gates, to the transmitting electrodes S1, S2. By means of capacitive coupling, a dielectric current i flows, which is fed through a measuring converter 6 and subsequent analog-digital conversion ADC 7 to an evaluation circuit 8. The measuring converter possesses a very low input impedance ($R_i$,<1/100. I/(2.π.f.C)), f being the frequency of the high-frequency signal and C describing the coupling capacity between the transmitting and receiving electrodes. The potential of the receiving electrode E is thereby almost at ground (virtual ground) and screening can be carried out passively by ground surfaces.

Figure 13:
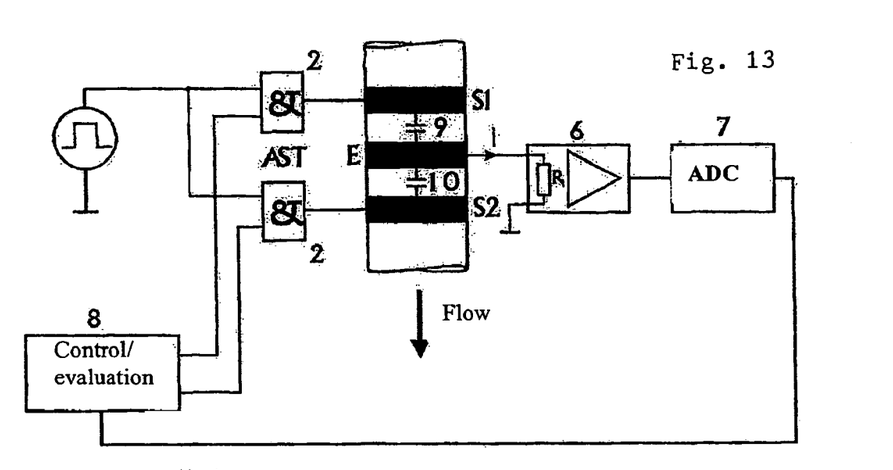
FIG. 13 shows, as a simplified block circuit diagram, the entire measuring configuration according to the invention.
Figure 14:
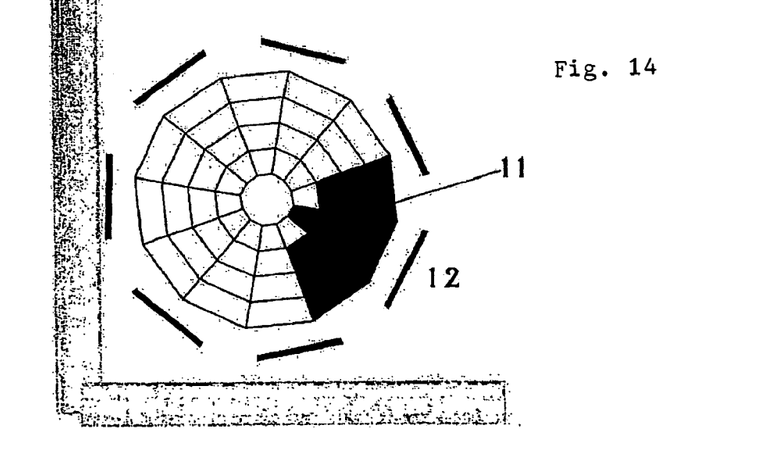
FIG. 14 is a diagrammatic cross section of that flow region in which fluctuations act strongly on a certain electrode.

The control and evaluation logics 8 first ensures that the electrodes S1, S2 located upstream and downstream are controlled cyclically in succession and the corresponding dielectric current i is measured. The dielectric current i here is directly proportional to the respective coupling capacity 9 or 10. A certain number N of temporally successive measured values is deposited in a memory of the control and evaluation logics 8. Here, measured data of the coupling capacity 10 are stored in a field X, data of the coupling capacity 9 in a field Y. The time-discrete cross correlation (short-term cross correlation) is defined as follows:

$$\Phi_{XY}[k] = \sum_{i=1}^{N} X[i] \cdot Y[i-k]$$

the measured values being freed from the arithmetic mean value prior to the correlation. The correlation function $\phi_{xy}$ is then a measure of the signal similarity. A fluctuation in the medium flowing past is first active in the upstream-relevant coupling capacity 9 and after the velocity-dependent transit time T in the downstream-relevant coupling capacity 10. That shift k which leads to a maximum in the correlation function $\phi_{xy}$ is thus proportional to the transit time T.

$$T = \Delta t \cdot \underset{k}{\mathrm{argmax}}\, \Phi_{XY}[k]$$

$\Delta t$ denotes the scanning time (i.e. the time interval between two measurements by the same transmitting electrode).

The velocity is calculated from $l_{eff}$ as the effective distance between the active regions as follows:

$$v = \frac{l_{eff}}{T}$$

With segmentation of the transmitting electrode as shown in FIG. 2, the cross correlations are in each case formed between all measured data pertaining to the respective segments of the first measuring plane, and all measured data pertaining to the respective segments of the second measuring plane. The sensitivity is thereby no longer the same over the entire tube, but is increased at certain sites and reduced at others—spatial resolution is thus possible.

The term "tube" used in the invention is not restricted to bodies having a round or rectangular periphery and can be used for the transport of liquids, powders, gases, and solids.

That section of the tube in which the measurement of the transport properties is carried out can differ from the rest of the tube system in material, structure, and properties such as the conductivity and elasticity. Irrespective of the design of the remaining tube system, the piece of tubing of the measurement section must consist at least partially of nonconducting material.

Capacitive filling level measurements of vessels are primarily used for upright containers and are known in the prior art. Here, the principle of capacitive filling level measurement is to be applied to horizontal or sloping tubes, since the electrode configuration according to the invention is also suitable for this purpose. Two exemplary embodiments of that section of tube which is used for the filling level measurement are given in FIGS. 3a and FIG. 3b. FIG. 3a is an embodiment which comprises a nonconducting tube, to the surfaces of which electrodes are applied. FIG. 3b shows an embodiment in which the described section of tube comprises continuous metal strips (electrodes), which are interrupted by nonconducting material such as, for example, plastics material. In its totality, a construction according to FIG. 3b presents a tube which is functional for the transportation or storage of liquids, powders, gases, and solids. The embodiments of FIGS. 3a and 3b can be used such that for the purpose of carrying out measurements, the capacities between relevant electrodes and the receiving electrode (see FIG. 4) can be observed. The substance in the tube, the filling level of which is to be determined, possesses a certain relative dielectric constant which is different from the dielectric constant of another medium in the tube (e.g. air). Physically, a change in the dielectric constant means a change in the capacity between the transmitting and receiving devices. For liquids, powders, and solids, a distribution similar to that shown in FIGS. 5a to 5c can be assumed. The presence of the substance in the tube, combined with its own relative dielectricity, changes the value of the capacity between the transmitting and receiving devices.

Figure 5A:
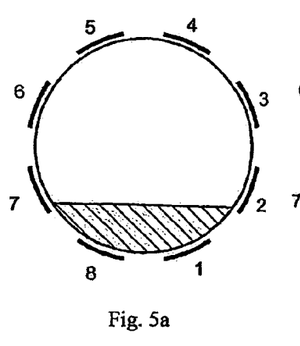
FIGS. 5a to 5c shows a tube provided with electrodes in diagrammatic cross section with three different filling levels.
Figure 5B:
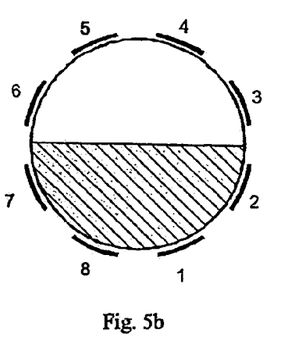

In FIG. 5a, a filling (relative dielectric constant of the material greater than that of the surrounding medium) means a capacity increase of $C_{1\_rec}$ and $C_{8\_rec}$ and minimal influence on the capacities $C_{2\_rec}$ and $C_{7\_rec}$, while $C_{3\_rec}$, $C_{4\_rec}$, $C_{5rec}$ and $C_{6\_rec}$ remain almost unchanged.

Figure 5C:
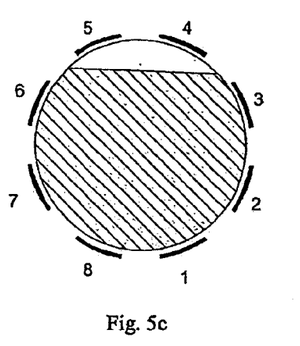

In FIG. 5b, again $C_{2\_rec}$ and $C_{7\_rec}$ are already greatly increased and in FIG. 5c all capacities up to $C_{4\_rec}$ and $C_{5\_rec}$ are markedly increased by the material in the interior of the tube.

For the construction of the section of tube, the arrangement according to FIG. 3b is to be preferred to that of FIG. 3a, since the influence of the tube itself only influences the measurement to a relatively small extent and more precise measurements are to be assumed.

It is recommended to use eight or more electrodes per transmitting device for the measurement of the filling level. Owing to the redundancy of the system (eight or more capacity values for one parameter), a relative measurement of the filling level is possible. The measurement is based on the detection of the ratios of the changes in the capacity values relative to one another. Thus, the measurement is independent of global disturbance variables such as temperature, humidity, etc., which would greatly influence an individual measurement. Only very local inhomogeneities have any influence on the results of the measurement.

Figure 6:
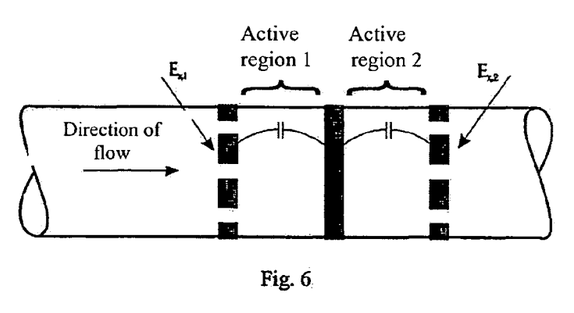
FIG. 6 is a view of a tube similar to FIGS. 2 and 4.
Figure 7:
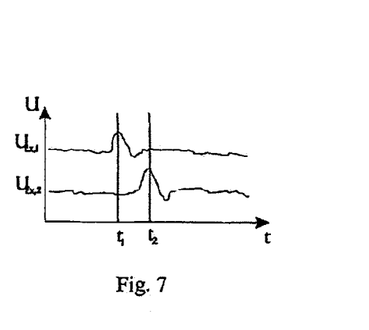
FIG. 7 is a diagram showing two starting signals of the evaluation device.

For the determination of the rate of transport, signals of electrodes corresponding to one another and proportional to the coupling capacities are correlated. FIG. 6 shows the principle used. A natural or deliberately introduced disturbance (=fluctuation in the distribution of the relative dielectricity) of the transported material causes a modified signal in the active region 1 of the configuration (e.g. at the level of the electrode $E_{x,1}$) because of the modified coupling capacity $E_{x,1\_rec}$. Immediately thereafter, this disturbance is in active region 2 (at level $E_{x,2}$) and causes a comparable signal modification (cf. FIG. 7). The change in shape of the disturbance with the distance covered illustrates the expediency of transmitting devices located close together.

Figures 8A, 8B:
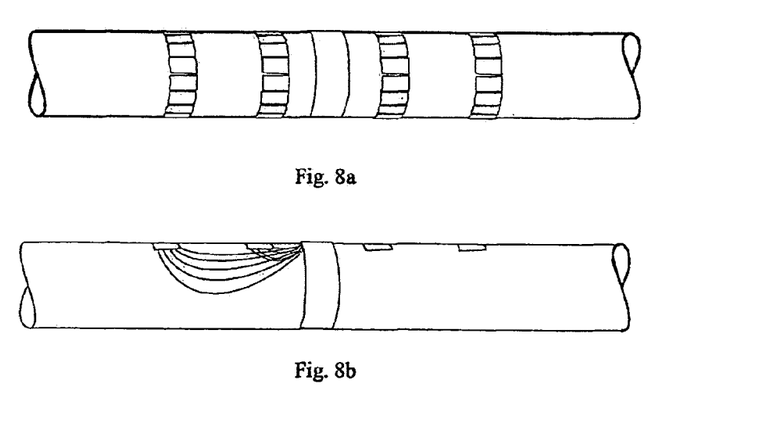
FIGS. 8a and 8b are side views of two further embodiments of electrode configurations, with which a velocity distribution profile can be determined.

Following the evaluation circuit, a signal $U_{EX,1}$ proportional to the coupling capacity will be tapped on the receiving device when (only) the electrode $E_{x,1}$ transmits. From the known distance of the active regions and the time difference, which is obtained, for example, from signals $U_{EX.1}$ and $U_{EX.2}$ corresponding to the cross correlation, a mean rate of transport can be calculated according to a known method. When using a number of transmitting devices (cf. FIG. 8a), a "low velocity distribution profile" can be determined by correlating signals which derive from transmitting devices situated at different distances from the receiving device, as regarded in the direction of flow. The electrical field of transmitting devices which are further removed from the receiving device is formed deeper in the transported material—the configuration is thus sensitive to disturbances in layers of the transported material which are further removed from the periphery of the delivery tube (cf. FIG. 8b).

Figure 9A:
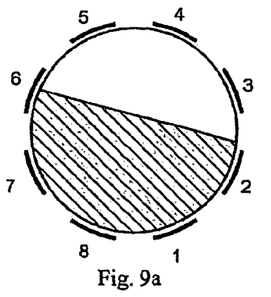
FIGS. 9a to 9c show, in views similar to FIGS. 5a to 5c, a circular flow at different points in time.
Figure 9B:
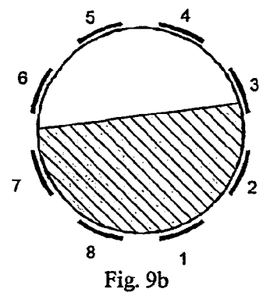
Figure 9C:
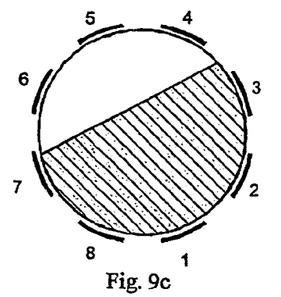

The measurement of the spreading behavior of the transported material in the direction of flow is carried out according to the same principle as the measurement of the filling level or density profile. By means of correlation, maximum similarity in the signal shapes in the density profiles of both spheres of action can be sought. If a change with respect to the position of the fluctuation relative to the electrodes from one observation site to the next (rotatory displacement) can be observed starting from a transported material rotating in the direction of flow (e.g. CFB, circulating fluidized bed)—depending on the direction and extent of the displacement from one sphere of action to the next, a distinction can be made between dextrorotatory and levorotatory transported material and the different degrees of rotation. FIGS. 9a to 9c show an example of circulating transported material.

Figure 10A:
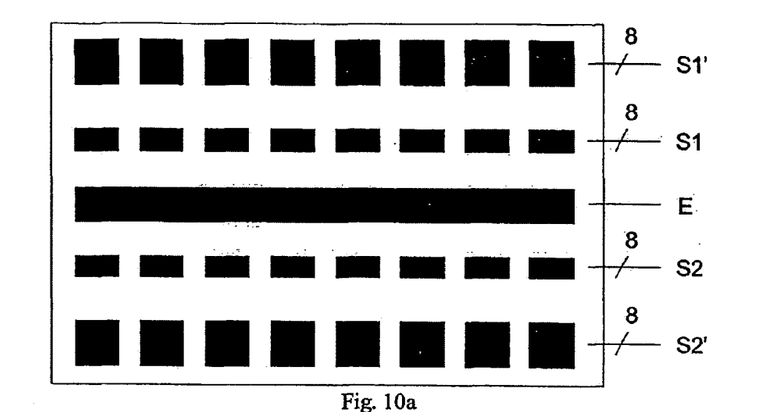
FIGS. 10a, 10b show, for example, embodiments of electrodes on a flexible insulating material.
Figure 10B:
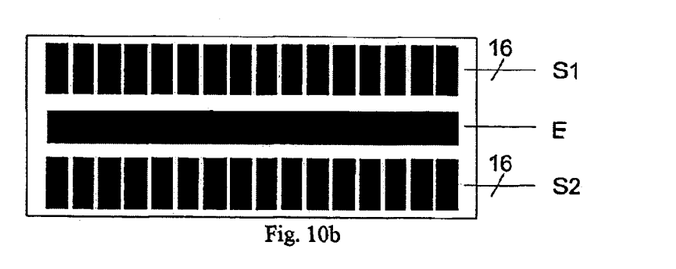
Figure 11A:
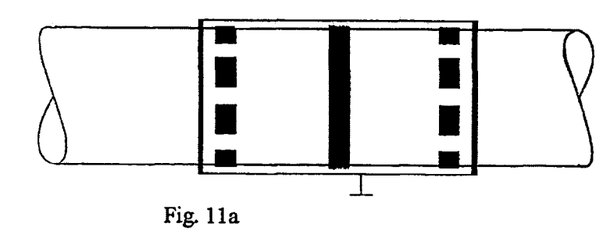
FIGS. 11a, 11b show the arrangement of a shield on a tube with electrodes, in a side view and in cross section.
Figure 11B:
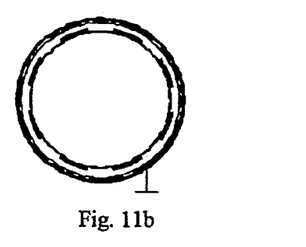

FIGS. 10a and 10b show exemplary electrode geometries of the subject matter of the invention, which are designed here as a so-called "flexprint" and can be mounted on an existing tube of a unit by wrapping. According to FIG. 10a, four transmitting electrode configurations S1, S1', S2, S2', in each case symmetrical to the receiving electrode in the direction of flow, each having eight electrodes, are provided, and FIG. 10b shows the electrode configuration for two transmitting devices, in each case having 16 electrodes. This construction as a flexprint represents an inexpensive and robust form of the geometry according to FIG. 3a. The wires (connections) to the electrode surfaces can be led out to a soldering surface for a (flat ribbon) cable on the flexprint (not shown in the figures). Insulation can be applied (e.g. wrapped) around the electrode configuration, in particular the receiving electrode, for reasons of achieving insensitivity to external noise and crosstalk between the conductors leading to the receiving electrode, to which insulation an electrical shield (cf. FIGS. 11a and b) is applied, e.g. a metal foil connected to a common ground). Such a shield also serves to minimize the outward radiation of electromagnetic waves from the transmitting devices.

In Xie C G, Huang S M, Hoyle B S, Thorn R, Lenn C, Snowden D and Beck M S 1992 *Electrical capacitance tomography for flow imaging—system model for development of Image reconstruction algorithms and design of primary sensors*IEE Proc. G 139 89-98, the method of back-projection is described, with which density profiles can be determined from measured data and known sensitivities. In spite of the modified electrode topology, this method is applicable both to the velocity distribution profile and the density profile.

For very turbulent streams and for very slow-moving streams, natural or artificially introduced disturbances can change greatly from one measuring plane to the next, which leads to poorer correlation of the derived signals of both planes. The nearer the two measuring planes are together, the lower the difference in the material distribution in both planes and the greater the similarity of the signals (good correlation). Because of the resulting decreased resolution of the measurement of the time difference (and thus the decreased resolution of velocity determination), one will endeavor, however, to increase this distance as far as the quality of the correlation function allows.

Figure 12:
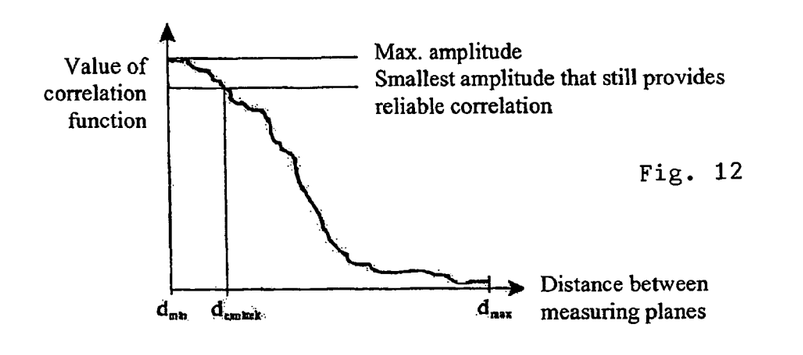
FIG. 12 is a graph illustrating the starting signal of the evaluation circuit as a function of the adjustable electrode distance.

In order to adapt the distance between the two measuring planes to the actual stream, the variant of the invention illustrated in FIG. 12 provides for adjustment of the distance between the electrodes as a function of the amplitude of the correlation function. The transmitting electrodes are here attached to carrier rings mounted for displacement along the tube, which can be shifted in position manually or automatically, for example by means of a spindle drive, controlled by the results of measurement.

On the assumption that the general transport conditions (e.g. parameters of the transport air supply) only change slightly during a stationary transport process, the distance between the two planes is altered from a minimum to a maximum position and for each position the correlation functions of corresponding electrodes are formed. That distance between the measuring planes at which the correlation functions (on average) still yield clearly detectable peaks, is used for the measurement of the transport properties. The relationship between the determined amplitude and the distance of a transmitting electrode from the receiving electrode is demonstrated, for example, in FIG. 12.

While preferred embodiments of the invention have been shown and described herein, it will be understood that such embodiments are provided by way of example only. Numerous variations, chanoes and substitutions will occur to those skilled in the art without departing from the spirit of the invention. Accordingly, it is intended that the appended claims cover all such variations as fall within the spirit and scope of the invention.

The invention claimed is:

1. A method for determining parameters of a fluctuating stream of fluid in a pipe using at least three electrodes provided at a periphery of the stream in spaced relationship to each other in a direction of flow, comprising:

sequencing the supply of an AC voltage signal to a first transmitting electrode located upstream of a receiving electrode and to a second transmitting electrode situated downstream thereof;

receiving signals at the receiving electrode that is located between the first and second transmitting electrodes in succession from the first and second transmitting electrodes in accordance with the sequencing of the supply of the AC signal;

analyzing the received signals from the first and second transmitting electrodes to detect a time-discrete cross correlation between received signals of the first and second transmitting electrodes; and determining transit times using the detected time-discrete cross correlation of the received signals.

2. A method as defined in claim 1, wherein:

the sequencing of the supply of the AC voltage signal includes feeding the AC voltage signal to the first and second transmitting electrodes in a temporally controlled manner; and the analyzing of the received signals includes carrying out the time-discrete cross correlation using a profile of the temporal control of the first and second transmitted signals.

3. A method as defined in claim 1, wherein the sequencing of the supply of the AC voltage signal is alternately switching the supply of the AC signal between the first and second transmitting electrodes.

4. A method as defined in claim 1, wherein the first transmitting electrode and/or the second transmitting electrode has a plurality of single transmitting electrodes distributed around the periphery of the stream.

5. A method as defined in claim 1, further comprising using a further first transmitting electrode and a further second transmitting electrode.

6. A method as defined in claim 1, further comprising determining a velocity-distribution profile from the transit times of fluctuations between the first and second electrodes by means of back projection.

7. A method as defined in claim 1, wherein the first and second electrodes are provided on a flexible insulating support material and the support material is disposed on the inner or outer surface of a delivery pipe for the fluid.

8. A method as defined in claim 1, wherein a common external shield is provided for the first and second electrodes.

9. A method as defined in claim 1, further comprising asymmetrically carrying out the supply of the AC voltage signal and measurement of the received signals on a common ground.

10. A method as defined in claim 4, wherein at least one of the plurality of single transmitting electrodes is shifted in position in an upstream/downstream direction relatively to the receiving electrode so that a relevant distance is adapted according to an amplitude of a resulting cross correlation value to optimize the amplitude of the resulting cross correlation value to conditions of flow.

11. A device for determining parameters of a fluctuating stream of fluid in a delivery pipe using at least three electrodes provided at a periphery of the stream in spaced relationship to each other in a direction of flow, comprising:

a first transmitting electrode configuration located upstream and a second transmitting electrode configuration located downstream, and a receiving electrode configuration located between transmitting electrodes of the first and second electrode configurations, the first and second electrode configurations being provided at the periphery of the stream of the fluid passing through the delivery pipe;

a receiving and evaluation device having a receiving electrode circumferentially surrounding the periphery of the stream for detecting the received signals produced by dielectric currents, for carrying out a time-discrete cross correlation and for determining transit times of fluctuations detected by the receiving electrode from cross correlation values; and a driver circuit for temporally controlled supplying of an AC voltage signal to the first and second transmitting electrode configurations.

12. A device as defined in claim 11, further comprising a driver circuit for temporally controlled supplying of an AC voltage signal to the transmitting electrode configurations.

13. A device as defined in claim 11, wherein at least one first transmitting electrode configuration and/or at least one second transmitting electrode configuration have/has a plurality of single electrodes distributed around the periphery of the stream.

14. A device as defined in claim 11, wherein two first transmitting electrode configurations and two second transmitting electrode configurations are provided.

15. A device as defined in claim 11, wherein the electrode configurations are provided on a flexible insulating support material and the support material is situated on inner or outer surface of the delivery pipe for the fluid.

16. A device as defined in claim 11, wherein a common external shield is provided for the electrode configurations.

17. A device as defined in claim 11, wherein at least one of the transmitting electrode configurations is mounted for displacement in the upstream/downstream direction relative to the receiving electrode configuration.

18. A device as defined in claim 11, wherein the receiving electrode is one common continuous receiver ring covering a circumference of the delivery pipe.

* * * * *